(12) United States Patent
Boisclair

(10) Patent No.: US 7,692,100 B2
(45) Date of Patent: Apr. 6, 2010

(54) SPACERS FOR CABLE CONDUCTORS

(75) Inventor: Brian Boisclair, Goffstown, NH (US)

(73) Assignee: Hendrix Wire & Cable, Milford, NH (US)

(*) Notice: Subject to any disclaimer, the term of this patent is extended or adjusted under 35 U.S.C. 154(b) by 0 days.

(21) Appl. No.: 12/506,703

(22) Filed: Jul. 21, 2009

(65) Prior Publication Data

US 2010/0012351 A1  Jan. 21, 2010

Related U.S. Application Data

(60) Provisional application No. 61/082,406, filed on Jul. 21, 2008.

(51) Int. Cl.
*H02G 7/12* (2006.01)
(52) U.S. Cl. .................. 174/146; 174/40 R; 174/41; 174/42; 248/62
(58) Field of Classification Search ........ 174/40 R, 174/40 CC, 42, 40 TD, 43, 44, 138 E, 138 G, 174/148, 154, 167, 146; 439/119, 161, 776; 248/61
See application file for complete search history.

(56) References Cited

U.S. PATENT DOCUMENTS

| 3,005,609 | A | * | 10/1961 | Joffe ............................ 248/61 |
| 3,139,482 | A | * | 6/1964 | Peters et al. ................ 174/160 |
| 3,834,674 | A | * | 9/1974 | Jackson ...................... 254/394 |
| D242,765 | S | * | 12/1976 | Patrick ........................ D8/356 |
| 5,721,393 | A | * | 2/1998 | Richardson, Jr. ............. 174/42 |
| 5,801,336 | A | * | 9/1998 | Blanding .................... 174/146 |
| 5,957,416 | A | * | 9/1999 | Sellati ......................... 248/61 |
| 6,008,453 | A | * | 12/1999 | Richardson, Jr. ............. 174/42 |
| 6,316,724 | B1 | * | 11/2001 | Blanding ................. 174/40 R |
| 6,448,503 | B1 | * | 9/2002 | McKinnon et al. .......... 174/146 |

* cited by examiner

*Primary Examiner*—Dhiru R Patel
(74) *Attorney, Agent, or Firm*—Jennifer Lacroix, Esq.; DLA Piper LLP US

(57) ABSTRACT

Spacers for use on power distribution lines are disclosed that include a body, a messenger hook, and a conductor hook. A messenger clamp is pivotally connected to the messenger hook, and is rotatable from an open position to a messenger engaging position. A conductor clamp is pivotally connected to the conductor hook, and is rotatable from an open position to a conductor engaging position.

20 Claims, 4 Drawing Sheets

SPACERS FOR CABLE CONDUCTORS

RELATED APPLICATIONS

This application claims priority to U.S. Provisional Patent Application Ser. No. 61/082,406, filed on Jul. 21, 2008, currently pending.

BACKGROUND

Spacers utilized with pole-mounted power distribution cables are described herein. More specifically, the spacers described herein include at least one clamp connector.

Utility wires that are attached to utility poles generally include a power distribution line, which can include several power conducting cables, and a messenger cable. A vertical spacer can be utilized at a utility pole to support and separate the phase conductors in a vertical configuration. Vertical spacers can be designed for single phase distribution circuits, or can be designed for use in multiple phase applications, where separation of the conductors is desired.

BRIEF SUMMARY

Spacers utilized with pole-mounted power distribution cables can have at least one clamp connector. In one aspect, single phase spacers are provided that include a messenger clamp and a conductor clamp. In another aspect, multiple phase spacers are provided that include a messenger clamp and at least one conductor clamp. Multiple phase spacers preferably have a plurality of conductor clamps.

BRIEF DESCRIPTION OF SEVERAL VIEWS OF THE DRAWINGS

Specific examples have been chosen for purposes of illustration and description, and are shown in the accompanying drawings, forming a part of the specification.

DETAILED DESCRIPTION

Spacers for use with power distribution cables hung on utility poles are preferably lightweight, durable and rugged. Spacers can preferably withstand a wide range of weather conditions, and are resistant to both shock and impact. Spacers can be formed in any suitable manner utilizing any suitable material, and preferably can be molded utilizing high density polyethylene.

Figure 1:
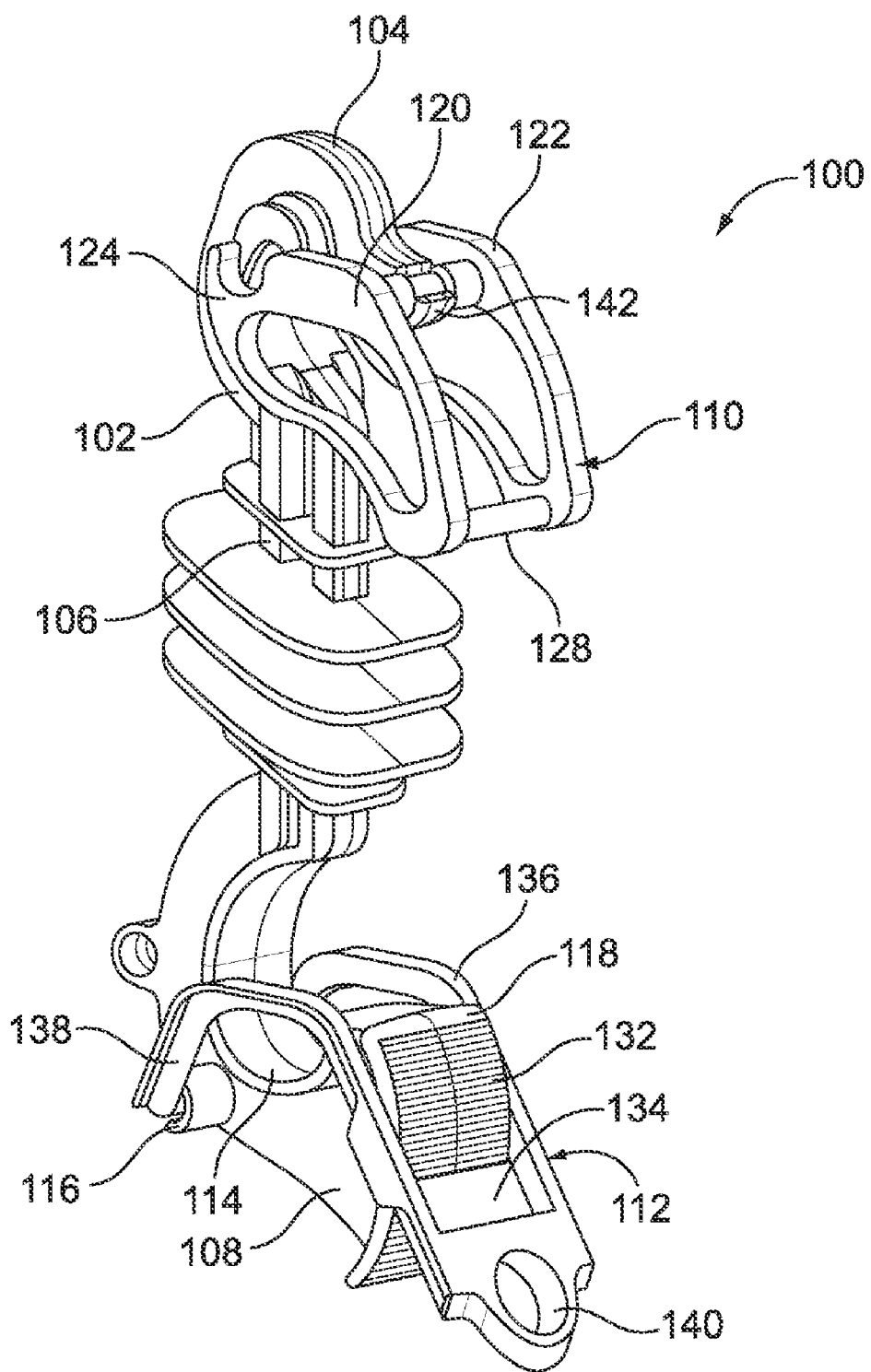
FIG. 1 is a perspective view of one embodiment of a single phase spacer.
Figure 2:
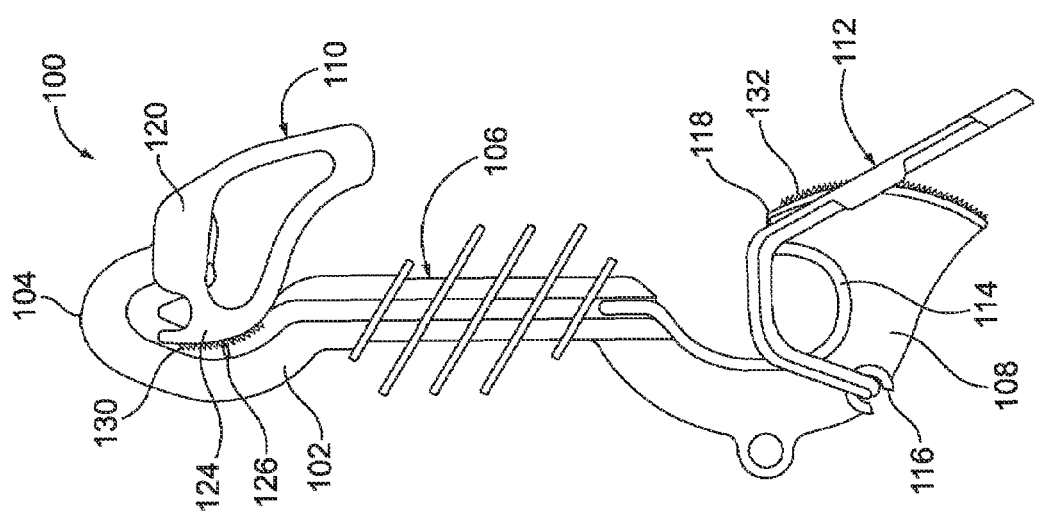
FIG. 2 is a side view of the single phase spacer of FIG. 1.

FIGS. 1 and 2 illustrate one example of a spacer 100. Spacer 100 can be utilized on single phase distribution circuits rated 20 kV (kilo volts), phase to ground. An example of a typical application for spacer 100 could be backlot, residential construction. In an alternative example, a multiple phase spacer can be utilized on distribution systems rated 5 kV through 15 kV where vertical separation of the conductors is desired.

The spacer 100 includes a body 102 having a messenger hook 104, a spacer portion 106, and a conductor hook 108. A messenger clamp 110 can be connected to the messenger hook 104, and a conductor clamp 112 can be connected to the conductor hook 108. At least one of the messenger clamp and the conductor clamp can be a ratchet clamp, which utilizes ratchet teeth as a locking mechanism.

The messenger hook 104 and messenger clamp 110 can be utilized to connect the spacer to a messenger, or to a bracket on a utility pole. In connecting a spacer to a bracket on a utility pole, a stirrup can be attached to the bracket, and the spacer can be attached to the stirrup. In connecting the spacer to a messenger, the messenger can be secured to the messenger hook 104 by messenger clamp 110.

Messenger hook 104 can be located at the top end of the spacer 100. The messenger hook 104 can be concave down, and preferably has at least one socket 142 on its front side, which pivotally receives the messenger clamp 110. Messenger clamp 110 can be pivotally connected to the front of messenger hook 104, and can rotate from an open position to a messenger clamping position. The messenger clamp 110 has a first side 120 and a second side 122. The first side 120 has a first locking portion 124. The second side 122 has a second locking portion (not shown), that can be substantially similar to the first locking portion 124, and is preferably identical or a mirror image thereof. The first and second locking portions can each have at least one locking feature. The messenger hook 104 can have a first locking blade 126 and a second locking blade (not shown), that engage the first and second locking portions of the messenger clamp 110, respectively. The second locking blade can be substantially similar to the first locking blade 126, and is preferably identical or a mirror image thereof. Preferably, the locking features on the first and second locking portions of the messenger clamp 110 each include a plurality of ratchet teeth 130. Ratchet teeth 130 on the first and second locking features allow for an adjustable locking engagement between the first and second locking features and the first and second locking blades, respectively.

The messenger clamp 110 can also include a gripping bar 128 adapted to be gripped by a tool used to rotate the messenger clamp 110 from an open position to a closed position, also called the messenger engaging position. For example, the gripping bar 128 can be gripped by a hot stick, which can then be used to rotate the messenger clamp 110 downwards from its open position to the messenger engaging position.

Conductor hook 108 can be located at the bottom end of the spacer 100, and includes a conductor seat 114, which is adapted to receive a conductor cable placed transversely thereon. Preferably, the conductor seat 114 is concave up, having an open curvature from the front end to the back end of the conductor hook 108, so that the conductor cable is received by the curve of the seat. The conductor hook 108 preferably has at least one socket 116 on its back side, which pivotally receives the conductor clamp 112. The conductor hook 108 can also have a locking base 118 on its front side. The locking base 118 is preferably arcuate, and forms a curve that bows outwardly from the conductor hook 108. Locking base 118 has at least one locking feature on its face. As illustrated in FIGS. 1 and 2, the locking feature can be a plurality of ratchet teeth 132. Ratchet teeth 132 can allow for an adjustable locking engagement between the conductor clamp 112 and the locking base 118, allowing the spacer 100 to be utilized with conductors of various diameters.

Conductor clamp 112 is pivotally connected to the conductor hook 108, and is rotatable from an open position to a closed position, also called a conductor engaging position. The conductor clamp 112 can have a first retaining arm 136, a second retaining arm 138, and a locking blade 134. The locking blade 134 engages at least one of the ratchet teeth 132 of the locking base 118 when the conductor clamp 112 is in the conductor engaging position. The conductor clamp 112 can also include a gripping aperture 140 that can be used to grip the conductor clamp 112 in order to rotate it from its open position to its cable engaging position. For example, the gripping aperture 140 can be gripped by a hot stick, which can then be used to rotate the conductor clamp 112 downwards from its open position to its cable engaging position.

While a spacer 100 can be any suitable length, a particularly preferred length for single phase spacer 100 is 12 inches, one foot, long, as measured from the center of the messenger hook 104 to the center of the conductor hook 108.

Figure 3:
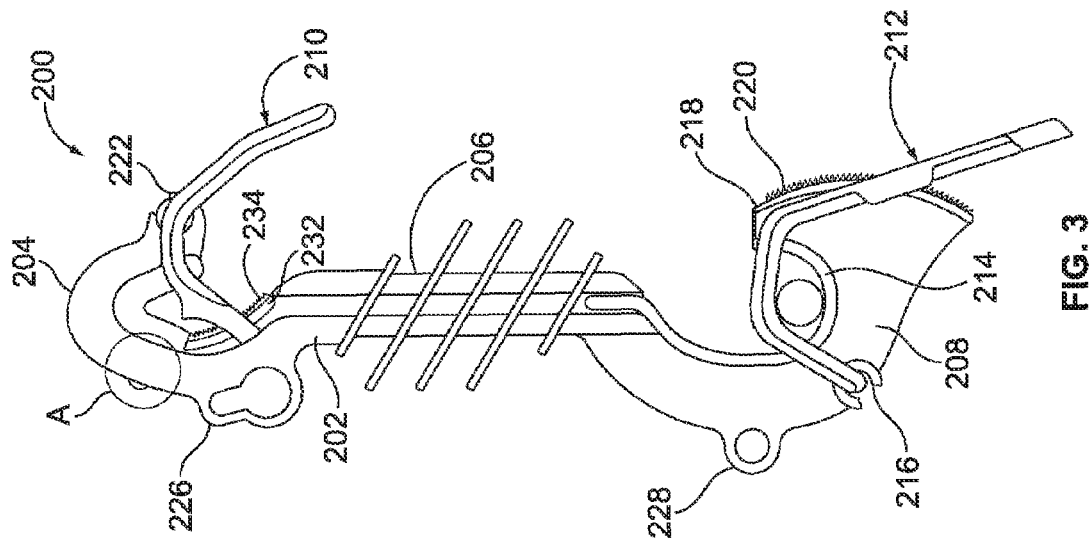
FIG. 3 is a side view of a second embodiment of a single phase spacer.
Figure 4:
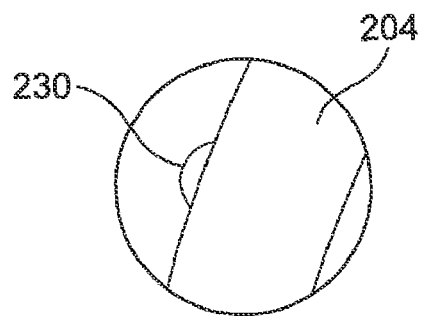
FIG. 4 is a detail view of section A of FIG. 3.
Figure 5:
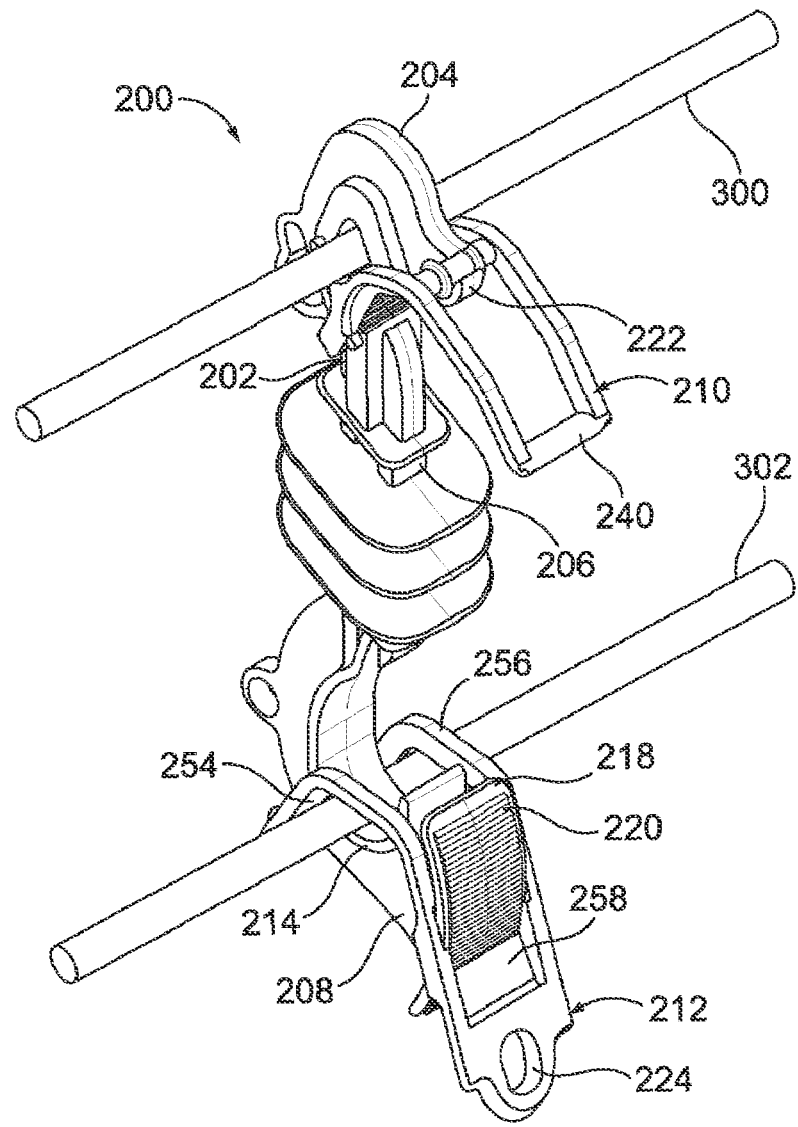
FIG. 5 is a perspective view of the embodiment of a single phase spacer of FIGS. 3 and 4, installed.

FIGS. 3 to 6 illustrate a second example of a spacer 200. Similarly to spacer 100, spacer 200 can also be utilized on single phase distribution circuits rated 20 kV (kilo volts), phase to ground. As shown in FIGS. 3 and 5, the spacer 200 includes a body 202 having a messenger hook 204, a spacer portion 206, and a conductor hook 208. A messenger clamp 210 can be connected to the messenger hook 204, and a conductor clamp 212 can be connected to the conductor hook 208.

As illustrated in FIG. 5, the messenger hook 204 and messenger clamp 210 can be utilized to connect the spacer 200 to a messenger 300. Alternatively, the messenger hook 204 and messenger clamp 210 can be utilized to connect the spacer 200 to a bracket on a utility pole. A conductor 302 can be secured to the spacer 200 using the conductor hook 208 and conductor clamp 212.

Spacer 200 also includes a lifting eye 226, an anti-sway bracket eyelet 228, and a ratchet keeper 230. The lifting eye 226 provides a connecting point for a hot stick, and can be utilized for lifting the spacer 200 during installation. The spacer 200 can be lifted and installed from the ground. Referring to FIG. 4, a detail view of the ratchet keeper 230 is provided. Ratchet keeper 230 can be a bump or protrusion, such as a half sphere. In practice, ratchet keeper 230 engages the messenger clamp 210 during installation, and can keep the messenger clamp 210 in an open position until the messenger is engaged. When the spacer 200 is installed, an anti-sway bracket can be connected to the anti-sway bracket eyelet 228 in order reduce or prevent swaying of the spacer 200.

Figure 6:
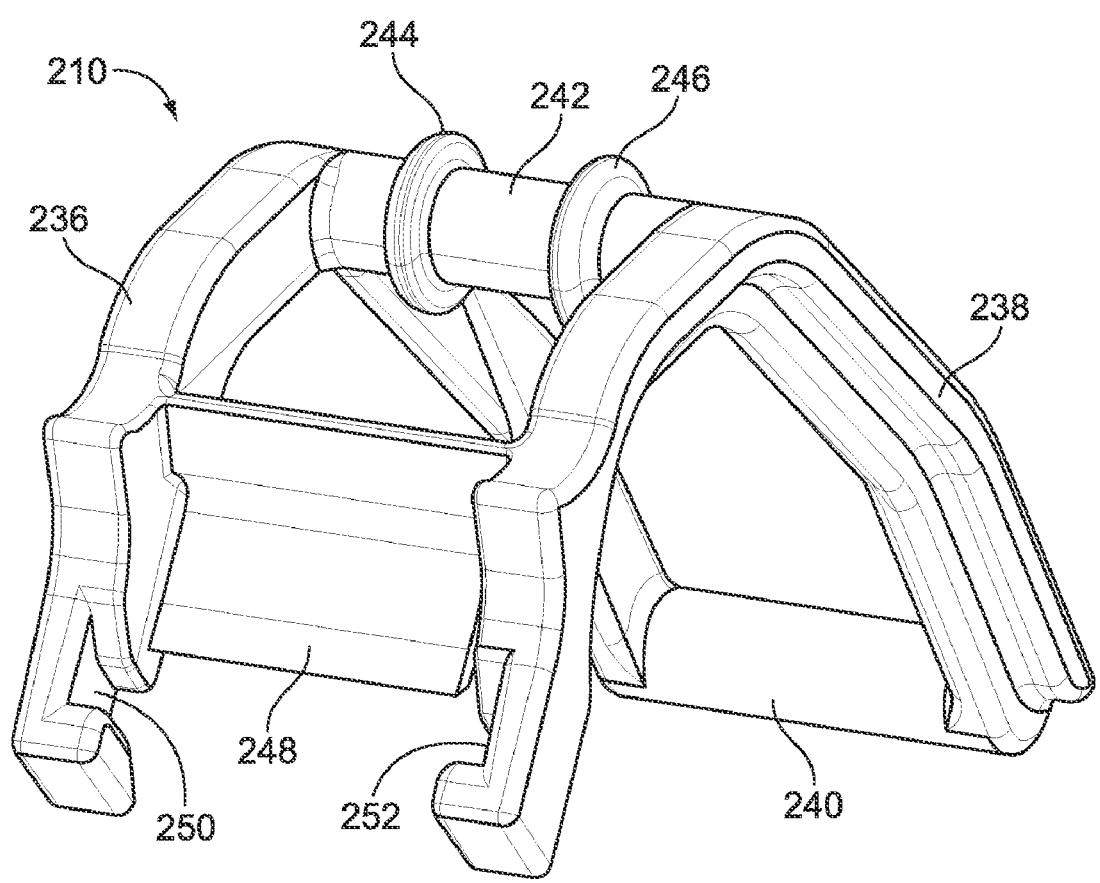
FIG. 6 is a perspective view of the messenger clamp of the embodiment of FIGS. 3-5.

Referring to FIGS. 3, 5 and 6, messenger hook 204 can be located at the top end of the spacer 200. The messenger hook 204 can be concave down, and preferably has at least one socket 222 on its front side, which pivotally receives the messenger clamp 210. The messenger hook 204 can also include a messenger hook locking base 232 on its front side. The messenger hook locking base 232 can be arcuate, and can form a curve that bows inwardly with respect to the messenger hook 204. Messenger hook locking base 232 has at least one locking feature on its front surface. As illustrated, the locking feature can be a plurality of ratchet teeth 234. Ratchet teeth 234 can allow for an adjustable locking engagement between the messenger hook 204 and the messenger clamp 210.

As illustrated, the axle 242 of the messenger clamp 210 can be pivotally received by the socket 222. Messenger clamp 210 can thus be pivotally connected to the front of the messenger hook 204. The axle 242 of the messenger clamp 210 can include a first boss 244 and a second boss 246, which can restrict horizontal sliding of the messenger clamp 210. The messenger clamp 210 can rotate from an open position to a closed position, also called a messenger clamping position, as illustrated in FIGS. 3 and 5. The messenger clamp 210 has a first side 236 and a second side 238. A locking blade 248 can extend from the first side 236 to the second side 238 of the messenger clamp 210. The locking blade 248 engages at least one of the ratchet teeth 234 of the messenger hook locking base 232 when the messenger clamp 210 is on the messenger engaging position. The messenger clamp 210 can also include a first guide 250 on its first side 236, and a second guide 252 on its second side 238. Guides 250 and 252 can slidably receive the messenger hook locking base 232 when the messenger clamp 210 is rotated to its messenger engaging position.

The messenger clamp 210 can also include a gripping bar 240 adapted to be gripped by a tool used to rotate the messenger clamp 210 from an open position to a messenger engaging position. For example, the gripping bar 240 can be gripped by a hot stick, which can then be used to rotate the messenger clamp 210 downwards from its open position to its messenger engaging position.

Referring to FIGS. 3 and 5, conductor hook 208 can be located at the bottom end of the spacer 200, and includes a conductor seat 214, which is adapted to receive a conductor cable placed transversely thereon. Preferably, the conductor seat 214 is concave up, having an open curvature from the front end to the back end of the conductor hook 208, so that the conductor cable is received by the curve of the seat. The conductor hook 208 preferably has at least one socket 216 on its back side, which pivotally receives the conductor clamp 212. The conductor hook 208 can also have a conductor locking base 218 on its front side. The conductor locking base 218 is preferably arcuate, and forms a curve that bows outwardly from the conductor hook 208. Conductor locking base 218 can have at least one locking feature on its face. As illustrated in FIGS. 3 and 5, the locking feature can be a plurality of ratchet teeth 220. Ratchet teeth 220 can allow for an adjustable locking engagement between the conductor clamp 212 and the conductor locking base 218, allowing the spacer 200 to be utilized with conductors of various diameters.

Conductor clamp 212 is pivotally connected to the conductor hook 208, and is rotatable from an open position to a closed position, also called a conductor engaging position. The conductor clamp 212 can have a first retaining arm 254, a second retaining arm 256, and a locking blade 258 that extends between the first and second retaining arms. The locking blade 258 engages the at least one locking feature of the locking base, such as, for example, engaging at least one of the ratchet teeth 220, when the conductor clamp 212 is in the conductor engaging position. The conductor clamp 212 can also include a gripping aperture 224 adapted to be used to grip the conductor clamp 212 in order to rotate it from its open position to its cable engaging position. For example, the gripping aperture 224 can be gripped by a hot stick, which can then be used to rotate the retaining clamp downwards from its open position to its cable engaging position.

While a spacer 200 can be any suitable length, a particularly preferred length for single phase spacer 200 is 12 inches, one foot, as measured from the center of the messenger hook 204 to the center of the conductor hook 208.

Multiple phase spacers can be similar to the single phase spacers described above. A multiple phase spacer can cave a body that includes a messenger hook and messenger clamp such as those described with respect to FIGS. 1 through 6. A multiple phase spacer can also include at least one spacer portion, and can include a plurality of spacer portions. A multiple phase spacer can also have a plurality of conductor hooks and conductor clamps, such as those described with respect to FIGS. 1, 2, 3 and 5 above.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A spacer for use with power distribution cables, the spacer comprising:
   a body including a messenger hook, a spacer portion, and a conductor hook, the conductor hook including a conductor locking base having at least one locking feature;
   a messenger clamp pivotally connected to the messenger hook; and
   a conductor clamp pivotally connected to the conductor hook, the conductor clamp including a first retaining arm, a second retaining arm, and a first locking blade that extends between the first and second retaining arms, wherein the locking blade engages the at least one locking feature of the conductor locking base when the conductor hook is in a conductor engaging position.

2. The spacer of claim 1, wherein the messenger hook includes at least one socket, and the messenger clamp includes an axle that is pivotally received by the at least one socket of the messenger hook.

3. The spacer of claim 2, wherein the axle further includes at least a first boss and a second boss to restrict horizontal sliding of the messenger clamp.

4. The spacer of claim 3, wherein the first and second locking portions of the messenger clamp each comprise a plurality of ratchet teeth.

5. The spacer of claim 1, the messenger clamp further including a first side having a first locking portion and a second side having a second locking portion, and the messenger hook further including a first locking blade and a second locking blade, wherein the first locking blade engages the first locking portion and the second locking blade engages the second locking portion when the messenger clamp is in a messenger engaging position.

6. The spacer of claim 1, the messenger clamp further including a first side, a second side, and a second locking blade that extends from the first side to the second side, and the messenger hook further including a messenger hook locking base having at least one locking feature, wherein the locking blade of the messenger clamp engages the at least one second locking feature of the messenger hook when the messenger clamp is in a messenger engaging position.

7. The spacer of claim 6, wherein the at least one locking feature comprises a plurality of ratchet teeth.

8. The spacer of claim 6, wherein the messenger clamp further includes a first guide on the first side, and a second guide on the second side, wherein the first and second guides slidably receive the messenger hook locking base when the messenger clamp is rotated to the messenger engaging position.

9. The spacer of claim 1, wherein the messenger clamp further includes a gripping bar adapted to be gripped by a tool used to rotate the messenger clamp from an open position to a messenger engaging position.

10. The spacer of claim 1, further comprising a lifting eye adapted to be used for lifting the spacer during installation.

11. The spacer of claim 1, further comprising a ratchet keeper adapted to engage the messenger clamp during installation and keep the messenger clamp in an open position until the messenger clamp is engaged.

12. The spacer of claim 1, the conductor clamp further including a gripping aperture adapted to be used to grip the conductor clamp to rotate it from its open position to its cable engaging position.

13. The spacer of claim 1, the conductor hook further comprising a conductor seat, the conductor seat being concave up and having an open curvature from a front end to a back end of the conductor hook.

14. The spacer of claim 1, wherein the conductor hook includes at least one socket that pivotally receives the conductor clamp.

15. The spacer of claim 1, wherein the spacer is a single phase spacer adapted to be utilized on single phase distribution circuits rated 20 kilo volts phase to ground.

16. A spacer for use with power distribution cables, the spacer comprising:
   a body including:
      a messenger hook including a first locking blade and a second locking blade,
      a spacer portion, and
      a conductor hook, the conductor hook including a conductor locking base having at least one locking feature;
   a messenger clamp pivotally connected to the messenger hook, the messenger hook including a first side having a first locking portion and a second side having a second locking portion, wherein the first locking blade of the messenger hook engages the first locking portion and the second locking blade of the messenger hook engages the second locking portion when the messenger clamp is in a messenger engaging position; and
   a conductor clamp pivotally connected to the conductor hook, the conductor clamp including a first retaining arm, a second retaining arm, and a locking blade that extends between the first and second retaining arms, wherein the locking blade engages the at least one locking feature of the conductor locking base when the conductor hook is in a conductor engaging position.

17. The spacer of claim 16, wherein the first and second locking portions of the messenger clamp each comprise a plurality of ratchet teeth.

18. A spacer for use with power distribution cables, the spacer comprising:
   a body including:
      a messenger hook including a messenger hook locking base having at least one locking feature,
      a spacer portion, and
      a conductor hook, the conductor hook including a conductor locking base having at least one locking feature;
   a messenger clamp pivotally connected to the messenger hook, the messenger clamp including a first side, a second side, and a locking blade that extends from the first side to the second side, wherein the locking blade engages the at least one locking feature when the messenger clamp is in a messenger engaging position; and
   a conductor clamp pivotally connected to the conductor hook, the conductor clamp including a first retaining arm, a second retaining arm, and a locking blade that extends between the first and second retaining arms, wherein the locking blade engages the at least one locking feature of the conductor locking base when the conductor hook is in a conductor engaging position.

19. The spacer of claim 18, wherein the at least one locking feature comprises a plurality of ratchet teeth.

20. The spacer of claim 18, wherein the messenger clamp further includes a first guide on the first side, and a second guide on the second side, wherein the first and second guides slidably receive the messenger hook locking base when the messenger clamp is rotated to a messenger engaging position.

* * * * *